(12) United States Patent
Itonaga et al.

(10) Patent No.: US 6,636,471 B2
(45) Date of Patent: Oct. 21, 2003

(54) OPTICAL PICK-UP

(75) Inventors: Makoto Itonaga, Yokohama (JP); Yuichi Hasegawa, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 422 days.

(21) Appl. No.: 09/732,888

(22) Filed: Dec. 11, 2000

(65) Prior Publication Data
US 2001/0004346 A1 Jun. 21, 2001

(30) Foreign Application Priority Data
Dec. 10, 1999 (JP) .......................................... 11-352391

(51) Int. Cl.$^7$ ................................................ G11B 7/00
(52) U.S. Cl. ................................ 369/112.07; 369/44.37
(58) Field of Search ........................... 369/44.23, 44.41, 369/44.42, 44.37, 112.03, 112.04, 112.05, 112.07, 112.1, 112.15

(56) References Cited

U.S. PATENT DOCUMENTS

| | | | |
|---|---|---|---|
| 5,391,865 A | * 2/1995 | Kurata et al. | 369/44.37 |
| 5,594,712 A | * 1/1997 | Yang | 369/44.23 |
| 5,602,383 A | 2/1997 | Takekoshi et al. | 250/201.5 |
| 5,627,812 A | 5/1997 | Yamamoto et al. | 369/112 |
| 5,636,190 A | 6/1997 | Choi | 369/44.23 |
| 5,648,950 A | 7/1997 | Takeda et al. | 369/110 |
| 5,687,153 A | 11/1997 | Komma et al. | 369/110 |
| 5,712,843 A | 1/1998 | Chao et al. | 369/112 |
| 5,737,296 A | 4/1998 | Komma et al. | 369/103 |

FOREIGN PATENT DOCUMENTS

| | | |
|---|---|---|
| EP | 0305169 A2 | 3/1989 |
| EP | 0829863 A2 | 3/1998 |

OTHER PUBLICATIONS

Patent Abstracts of Japan, vol. 1998, No. 7, Mar. 31, 1998 & JP 08 017058 A (Samsung Electron Co. Ltd), Jan. 19, 1996.

Freeman et al, Jpn. J. Appl. Phys., vol. 38, "Robust Focus and Tracking Detection for . . .", pp. 1755–1760, Mar. 1999.

* cited by examiner

Primary Examiner—Thang V. Tran
(74) Attorney, Agent, or Firm—Jacobson Holman PLLC

(57) ABSTRACT

An optical pick-up emits three laser beams onto an optical disk. The three laser beams are reflected on the optical disk and incident to a condenser lens. The three laser beams are further incident to a holographic device via the condenser lens. The surface of the holographic device is divided into a first and a second hologram region by a bisecting line oriented almost parallel to the track formed on the optical disk. The holographic device generates ±1th-order diffracted light beams on the hologram regions. The ±1th-order diffracted light beams are incident to a photodetector having a plurality of photo-detecting segments corresponding to the ±1th-order diffracted light beams. The photodetector detects signals recorded on the optical disk based on the ±1th-order diffracted light beams.

9 Claims, 5 Drawing Sheets

22(SSD)

22(DPP)

OPTICAL PICK-UP

BACKGROUND OF THE INVENTION

The present invention relates to an optical pick-up for writing/reading data to/from an optical disk.

Well known techniques for detecting signals from optical disks have advantages and also disadvantages.

Such advantages and also disadvantages surface, particularly, for optical disk drives to drive several types of optical disks.

In detail, a differential push-pull (DPP)-tracking error detection technique is used for DVD-R (rewritable DVD) when no data have been recorded.

The DPP-tracking error detection technique, however, produces only a small amplitude in tacking error signals, thus resulting in inadequate servo characteristics, for signal reproduction from ROM disks, such as, DVD-Videos. Because ROM disks have pits the depth of which is decided for a phase-difference detection (DPD)-tracking error detection technique.

For signal detection from DVD-R and ROM disks, optical disk drives, therefore, require both DPP and DPD-tracking error detection mechanisms.

An astigmatism-focus detection technique with the DPP- and DPD-tracking error detection can be achieved by a relatively simple configuration of optical system.

However, this technique raises problems, for land and groove recording-type optical disks, such as, DVD-RAM disks recorded with data in both lands and grooves, such that signals from an optical pick-up when traversing tracks on the optical disks in seeking would be mixed with focus error signals.

Providing detection mechanisms for every type of optical disks on one optical disk drive, for solving such problems results in a complex optical system, a number of signal lines from a photodetector, several stages of I/V amplifiers for current-to-voltage conversion of signals from the optical detector and arithmetic circuitry, and so on.

Moreover, such an optical disk drive has other problems when installing another detection mechanism for rewritable optical disks.

In detail, rewritable optical disks are recorded with wamble signals with undulation in the direction of tracks by groove-modulation and also address signals in pits for address management. These signals are, however, easily distorted by positional displacements in optical axis and optical detector, etc.

SUMMARY OF THE INVENTION

A purpose of the present invention is to provide an optical pick-up for detecting signals from several types of optical disks by using detection techniques, such as DPD, DPP and SSD (spot-size detection).

The present invention provides an optical pick-up including: a condenser lens to accept three laser beams reflected on an optical disk; a holographic device to accept the three laser beams via the condenser lens, a surface of the holographic device being divided into a first and a second hologram region by a bisecting line oriented almost parallel to track formed on the optical disk, thus generating ±1th-order diffracted light beams on the hologram regions; and a photodetector to accept the ±1th-order diffracted light beams to detect signals recorded on the optical disk, the photodetector having a plurality of photo-detecting segments corresponding to the ±1th-order diffracted light beams.

DETAILED DESCRIPTION OF PREFERRED EMBODIMENTS

Preferred embodiments according to the present invention will be disclosed with reference to the attached drawings.

Before disclosing embodiments according to the present invention, several types of signal detection are discussed.

Figure 1:
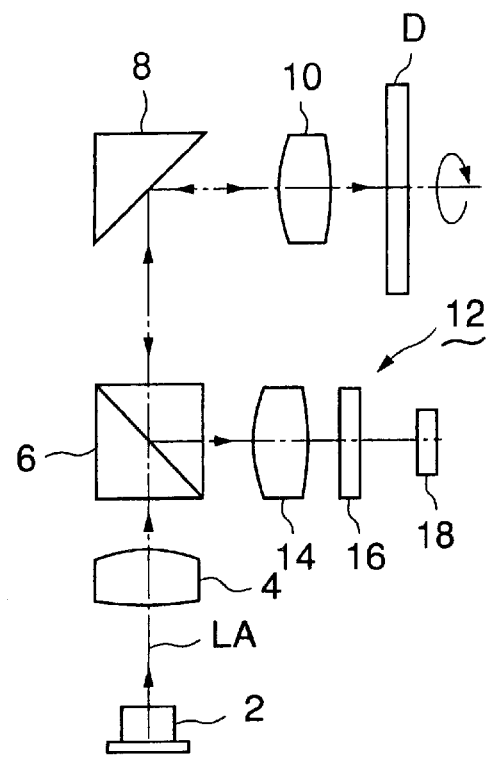
FIG. 1 shows a basic configuration of an optical pick-up for explaining several types of signal detection techniques.

In FIG. 1, a laser beam LA emitted by a semiconductor laser diode 2 is converted into a bundle of parallel beams by a collimator lens 4.

The parallel beams pass through a polarization beam splitter (or half mirror) 6 and reflected by a mirror 8 and converged onto an optical disk D by an objective lens 10 to form an optical spot on the disk D.

A light beam reflected on the surface of the optical disk D passes through the objective lens 10 and incident to the polarization beam splitter 6 via the mirror 8 as parallel beams.

The parallel beams are reflected by the polarization beam splitter 6 and guided to a signal-detection optical system 12.

The signal-detection optical system 12 employs astigmatism-focus error signal detection and push-pull-tracking error signal detection techniques.

The parallel beams reflected by the polarization beam splitter 6 are focused on a cylindrical lens 16 by a condenser lens 14 to generate astigmatism and form an optical spot on a quartered photodetector 18.

The astigmatism-focus error signal detection technique utilizes the astigmatism generated by the cylindrical lens 16. A circular optical spot is formed on the photodetector 18 while the optical spot on the optical disk D is in focus thereon, and the circular spot becomes elliptical as the spot on the disk D is gradually out of focus while the disk D is approaching or moving apart from the optical pick-up.

As an optical spot on the optical disk D moves from side to side over the tracks, an optical spot on the quartered photodetector 18 moves from side to side. Tracking error signals are then detected by the difference between signals on two pairs of detecting segments on the photodetector 18 located right and left with respect to the tracks on the optical disk D.

The push-pull-tracking error signal detection technique has a problem in that lens-shifting of the objective lens 10 in the tracking direction generates offsetting to the tracking error signals.

This problem is solved by a phase-difference detection (DPD)-tracking error detection technique that detects phases in pits on the optical disk D. Signals detected by the quartered photodetector 18 are processed to produce tracking error signals.

Figure 2:
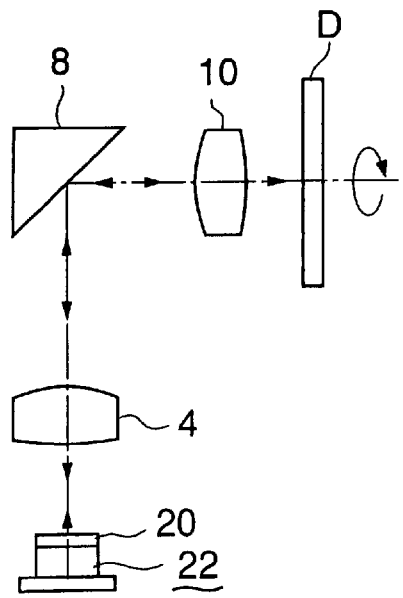
FIG. 2 shows another basic configuration of an optical pick-up for explaining several types of signal detection techniques.

Illustrated in FIG. 2 is an optical pick-up utilizing hologram. Elements in this mechanism that are the same or analogous to the elements shown in FIG. 1 are referenced by the same reference numerals.

A holographic device 22 has a package in which a semiconductor laser diode and a photodetector are installed, with a holographic element 20 attached to the package, for servo signal detection.

A laser beam emitted by the semiconductor laser diode is incident to the holographic element 20. The zero-order diffracted beam is generated and guided onto the optical disk D via the collimator lens 4, the mirror 8 and the objective lens 10 to form an optical spot thereon.

A light beam reflected on the optical disk D is converted into a convergent bundle of beams via the objective lens 10, the mirror 8 and the collimator lens 4, and incident to the holographic element 20.

The holographic element 20 generates the ±1th-order or the −1th-order diffracted light beam for servo signal detection.

Figure 3:
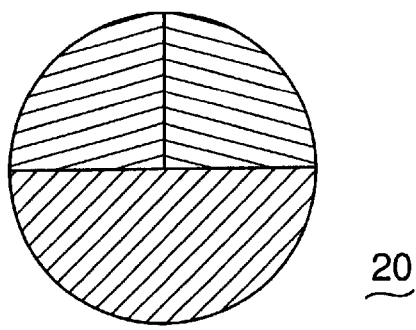
FIG. 3 illustrates an example of a divided pattern on a holographic element.

Illustrated in FIG. 3 is an example of a divided pattern on the holographic element 20, having a three-region diffracting surface with the first bisecting line on the diameter and the second bisecting line orthogonal to the first bisecting line, for knife-edge focus signal detection and DPD-tracking signal detection by using the ±1th-order diffracted light beam.

Figure 4:
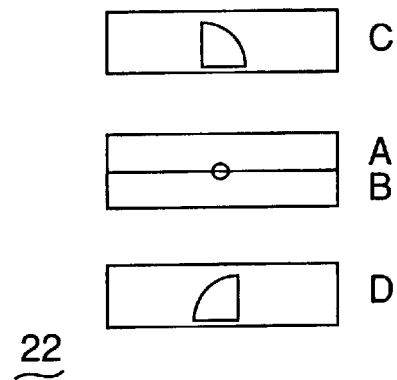
FIG. 4 illustrates an example of a pattern on a photodetector.

Illustrated in FIG. 4 is an example of a pattern on the holographic device 22 having four photo-detecting segments A to D.

A focus error signal FE and a tracking error signal TE are obtained as follows:

$$FE = A-B$$

$$TE = \text{phase } C - \text{phase } D$$

where "phase" represent a phase of the signal detected on each segment.

Figure 5:
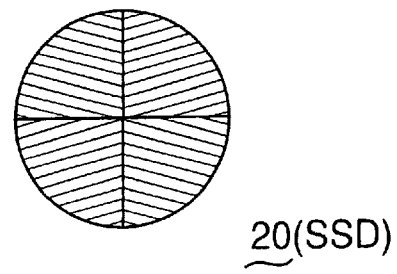
FIG. 5 illustrates an example of a divided pattern on the holographic element for SSD-focussing error signal detection.

Illustrated in FIG. 5 is an example of a divided pattern on the holographic element 20 for spot-size (SSD)-focussing error signal detection using the ±1th- and −1th-oder diffracted light beams.

The holographic element 20 in this example has four diffracting regions divided by two diameter-length bisecting lines orthogonal to each other.

Figure 6:
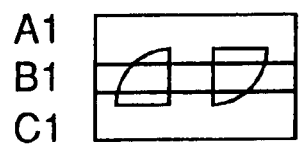
FIG. 6 illustrates is an example of a pattern on a holographic device having photo-detecting segments.
Figure 6:
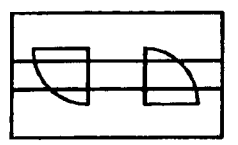
Figure 6:
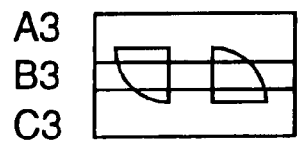
Figure 6:
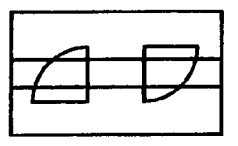

Illustrated in FIG. 6 is an example of a pattern on the holographic device 22 having 12 photo-detecting segments A1 to A4, B1 to B4, C1 to C4 and D1 to D4.

A focus error signal FE and a tracking error signal TE are obtained as follows:

$$FE = (A1+C1+A2+C2+A3+C3+A4+C4) - (B1+B2+B3+B4)$$

$$TE = \text{phase } (A1+B1+C1+A4+B4+C4) - \text{phase } (A2+B2+C2+A3+B3+C3)$$

For rewritable optical disks, such as, DVD-R, DVD-RW and DVD-RAM, with no pits thereon while no data having been recorded, a differential push-pull (DPP)-tracking error signal detection technique is employed that requires no pits for detection with no offsetting that would otherwise be generated due to lens-shifting, instead of a DPD-tracking error signal detection technique for detecting phases in the pits.

The DPP-tracking error signal detection, like a well known three-beam technique, divides a laser beam to be illuminated onto an optical disk into a main beam and sub-beams by means of a diffraction grating.

The sub-beams are illuminated onto the optical disk a little bit displaced from the main beam for signal detection in right and left with respect to the tracks on the disk.

The three-beam technique emits sub-beams on an optical disk displaced by ¼ tracks right and left from a main beam, for tracking error signal detection based on the difference in strength of the sub-beams.

On the other hand, the DPP-technique emits sub-beams on an optical disk displaced by ½ tracks right and left from a main beam. A photodetector for sub-beam detection is divided into two in the direction of detecting a push-pull signal. The difference between a push-pull signal based on the main beam and another push-pull signal based on the sub-beams cancels offsetting of the push-pull signal due to lens-shifting of the objective lens.

Figure 7:
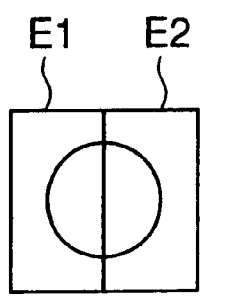
FIG. 7 illustrates an example of a pattern of a photodetector for DPP-tracking error signal detection.
Figure 7:
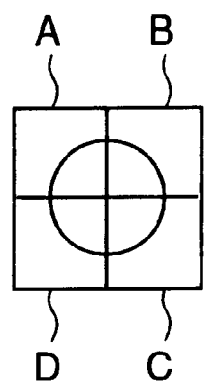
Figure 7:
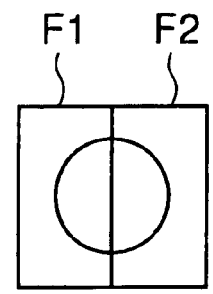

Illustrated in FIG. 7 is an example of a pattern of a photodetector for DPP-tracking error signal detection.

The photodetector (holographic device 22) in this example has a quartered photo-detecting segments A to D and a bisected optical detecting segments E1 and E2, and F1 and F2.

A tracking error signal TE is obtained as follows:

$$TE = ((A+D)-(B+C)) - G((E1-E2)+(F1+F2))$$

where "G" represents a gain decided according to a groove depth of a diffraction grating for obtaining a preferable ratio in amount of divided light of a spot light on an optical disk.

Based on the differences between the several types of signal detection techniques as discussed above, preferred embodiment according to the present will now be described in detail.

Figure 8:
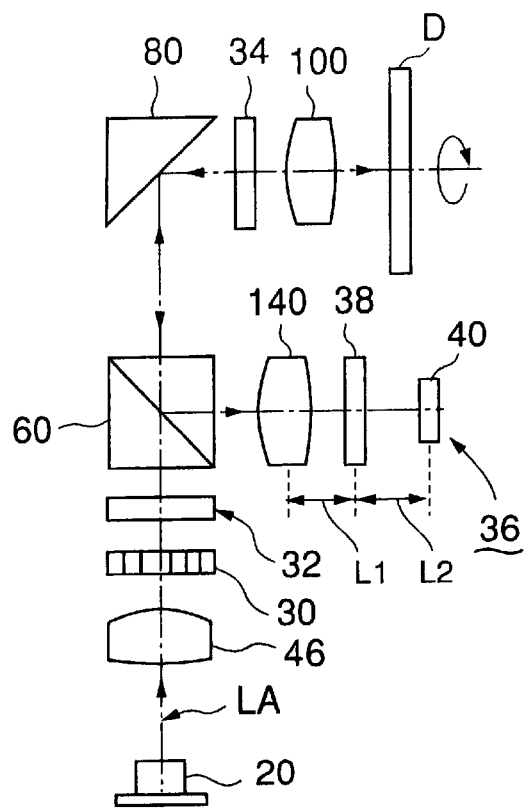
FIG. 8 shows a configuration of an optical pick-up as a preferred embodiment according to the present invention.

FIG. 8 shows a configuration of an optical pick-up as a preferred embodiment according to the present invention.

The optical pick-up is provided with a laser diode 20 for emitting a laser beam LA for data-reading/writing; a collimator lens 46 for converting the laser beam LA into a bundle of parallel beams; a diffraction grating 30 for diffracting the bundle of parallel beams into three beams, or one main beam and two sub-beams; a prism 32 for luminous pattern conversion; a polarization beam splitter 60; a mirror 80 for reflecting the three beams to an optical disk D; a ¼-wave plate 34 for converting the three beams into circularly polarized light beams, and an objective lens 100 for focussing the three beams onto the optical disk D.

Figure 9:
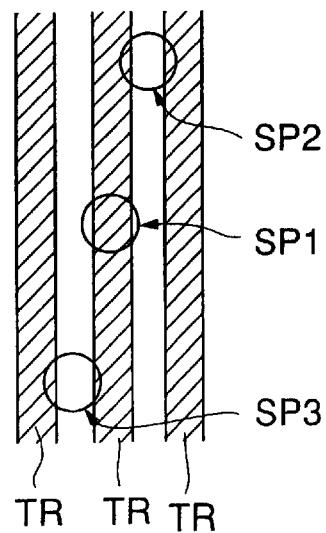
FIG. 9 illustrates an arrangement of optical spots formed on an optical disk.

The diffraction grating 30 is adjusted for its rotary angle so that, as illustrated in FIG. 9, three beam spots are formed in the direction of disk tracks TR, and two sub-beam spots SP2 and SP3 are formed as displaced from a main beam spot SP1 by ½ tracks.

The optical pick-up (FIG. 8) is further provided with a signal-detection optical system 36 constituted by a condenser lens 140, a holographic device 38 and a photodetector 40. The signal-detection optical system 36 is configured such that a distance L1 between the condenser lens 140 and the holographic device 38 is shorter than a distance L2 between the holographic device 38 and the photodetector 40.

Figure 10:
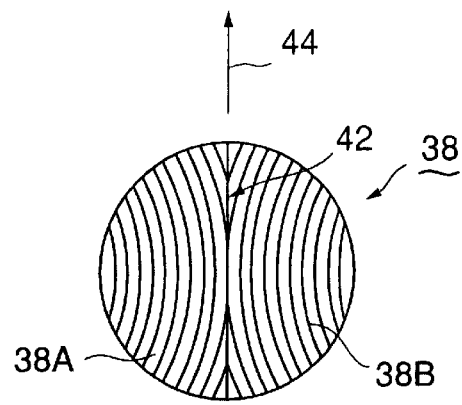
FIG. 10 is a plan view of a holographic device installed in the optical pick-up shown in FIG. 8.

The holographic device 38 is shaped like a disk with a center-bisecting line 42 as illustrated in FIG. 10. Two types of diffracting regions are formed on the holographic device 38 at both sides of the bisecting line 42. The bisecting line 42 is oriented in the direction depicted by an arrow 44 almost parallel to disk tracks in the pattern of a bundle of beams through the middle two cells and the outer two cells and DPD-signal detection is performed through the upper two cells and the lower two cells in each middle-stage segment, such as, the segment 52-5.

Figure 11:
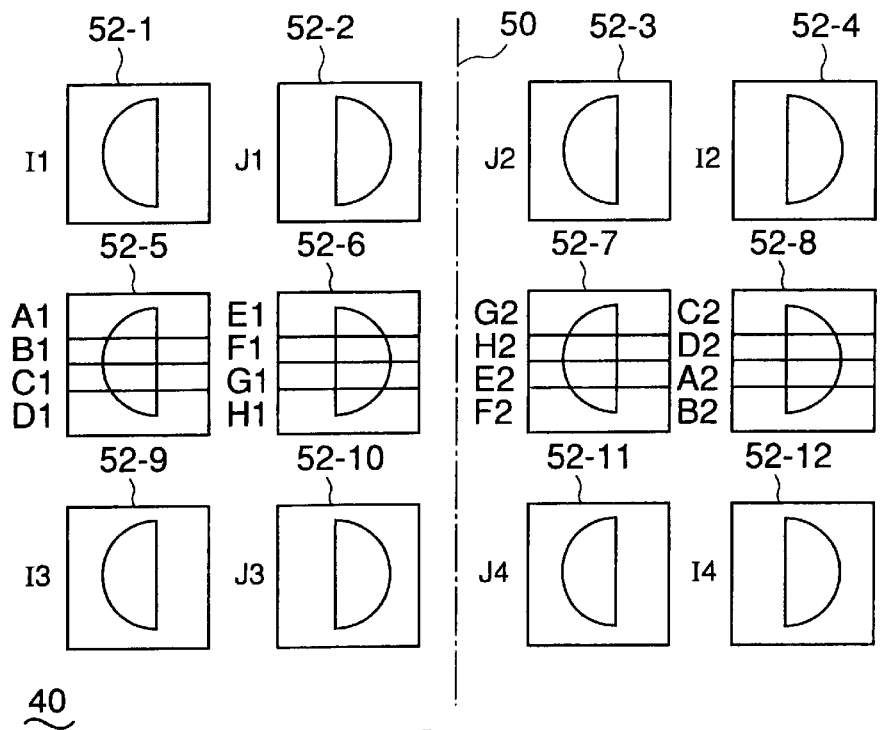
FIG. 11 illustrates an arrangement of photo-detecting segments on a photodetector installed in the optical pick-up shown in FIG. 8.

The cells are denoted by A1 to H1 and A2 to H2; and the non-divided segments 52-1 to 52-4 and 52-9 to 52-12 are denoted by I1, J1, J2 and I2, and I3, J3, J4 and I4, respectively, in FIG. 11. These notations are also used to represent signals generated through the cells and segments.

An operation of the optical pick-up (FIG. 8) according to the present invention will be disclosed in detail.

A laser beam (linearly polarized light beam) LA emitted by the laser diode 20 is converted into a bundle of parallel beams by the collimator lens 46. The parallel beams are diffracted into one main beam and two sub-beams by the diffraction grating 30. The elliptical luminous pattern of the three beams is transformed into the circular pattern by the prism 32.

The three beams then passes the polarization beam splitter 60 and reflected by the mirror 80. The reflected beams (first linearly polarized light beams) are incident to the ¼-wave plate 34 and converted into circularly polarized light beams. The beams are converged onto the optical disk D via the objective lens 100 to form three beam spots on the disk surface.

As illustrated in FIG. 9, the main beam spot SP1 and the sub-beam spots SP2 and SP3 are so formed that the sub-beam spots are displaced from the main spot by ½ tracks, which is obtained by adjustment of a rotary angle of the diffraction grating 30.

The light beams reflected on the disk surface are incident again to the ¼-wave plate 34 via the objective lens 100. The circularly polarized light beams are converted into second linearly polarized light beams, the polarization plane of which is orthogonal to that of the first linearly polarized light beams.

The second linearly polarized light beams are reflected by the mirror 80 and incident again to the polarization beam splitter 60. The second linearly polarized light beams are reflected by the polarization beam splitter 60 due to their polarization plane orthogonal to that of the first linearly polarized light beams, and guided to the signal-detection optical reflected by the optical disk D. A circular grating is formed on each of hologram regions 38A and 38B.

The three beams are incident to the holographic device 38 so that they straddle the bisecting line 42, thus at least the ±1th-order diffracted light beams being generated.

The photodetector 40 for accepting the ±1th-order diffracted light beams has a optical receiving surface, as illustrated in FIG. 11, for spot-size (SSD)-focus detection, DPD- and differential push-pull (DPP)-tracking detection.

Formed on the optical receiving surface are twelve photo-detecting segments 52-1 to 52-12. The photo-detecting segments are arranged such that segment pairs, such as (52-1, 52-2) and (52-3, 52-4), are provided to straddle a symmetry axis 50 in each of three stages. The symmetry axis 50 is also oriented in the direction almost parallel to disk tracks in the pattern of a bundle of beams reflected by the optical disk D.

In particular, each of the middle stage-segments 52-5 to 52-8 is divided into four segment sections to form four cells, thus totally twenty-four divided regions being formed on the receiving surface.

Moreover, the photo-detecting segments are located to accept the twelve ±1th-order diffracted light beams.

In detail, the four segments 52-5 to 52-8 in the middle stage accept the diffracted light beams generated based on the main beam (SP1) spot on the optical disk D, for focus and DPD-detection.

On the other hand, the upper stage-segments 52-1 to 52-4 and the lower-stage segments 52-9 to 52-12 accept the diffracted light beams generated based on the spots of the sub-beams SP2 and SP3, respectively, on the optical disk D, for DPD-detection.

Hologram-pitch and -pattern are set for the holographic device 38 (FIG. 10) so that light beams passing through the hologram region 38A are incident to the outer segments (52-1, 52-5, 52-9) and (52-4, 52-8, 52-12) whereas light beams passing through the hologram region 38B are incident to the inner segments (52-2, 52-6, 52-10) and (52-3, 52-7, 52-11).

Moreover, in FIG. 11, SSD-focus detection is performed system 36.

The second linearly polarized light beams are converted into a convergent bundle of beams by the condenser lens 140. The convergent bundle of beams are incident to the holographic device 38 and diffracted into the ±1th-order diffracted light beams. The diffracted light beams are incident to the photodetector 40.

The holographic device 38 is configured so that it is divided into two holographic elements in the direction parallel to the tracks TR on the optical disk D (FIGS. 8 and 9). The holographic elements convert an optical axis for forming an optical spot on the optical receiving surface of the photodetector 40, and act as a concave lens for a negative power and a convex lens for a positive power due to the ±1th-order diffracted light beams.

In FIG. 11, the middle four segments 52-5 to 52-8 are provided for focus detection, DPD-detection and RF-signal detection to the main beam spot on the optical disk D. The upper and lower eight segments 52-1 to 52-4 and 52-9 to 52-12 are used for DPP-detection to the sub-beam spots on the optical disk D.

Each of the middle segments 52-5 to 52-8 is divided into four, for SSD, DPD, PP and DPP-detection. For example, on the middle segment 52-5, the difference between the addition of the signals generated from the segments B1 and C1 and the addition of those from the segments A1 and D1 are used for SSD-focus detection. Moreover, the addition of the signals from the segments A1 and B1 and the addition of those from the segments C1 and D1 are used for detecting a portion of a DPD-signal.

The SSD-detection with less affection of optical distribution and lens displacement, etc., is achieved in the present invention by detecting both the tracking error signal and the DPD-signal generated before and after a focal point of the beam spot on the optical detector 40.

Among the photo-detecting segments on the optical receiving surface of the optical detector 40, the segments 52-1, 52-5 and 52-9 correspond to the +1th-oder diffracted light beams on the hologram region 38A (FIG. 10), the segments 52-2, 52-6 and 52-10 correspond to the +1th-oder diffracted light beams on the hologram region 38B, the segments 52-3, 52-7 and 52-11 correspond to the −1th-oder diffracted light beams on the hologram region 38B, and the segments 52-4, 52-8 and 52-12 correspond to the −1th-oder diffracted light beams on the hologram region 38A, where the hologram regions 38A and 38B can be reversed, and also the +1th- and the −1th-order diffracted light beams can be reversed.

A servo error (FE: focus error) signal, a tracking error (TE) signal, a RF signal, and a PPS (push-pull) signal can be obtained as follows:

$$FE(SSD)=(B+C+F+G)-(A+D+E+H)$$

$$TE(DPD)=\text{phase}(A+B+G+H)-\text{phase}(E+F+C+D)$$

$$TE(DPP)=((A+B+C+D)-(E+F+G+H))-\text{Gain}(I-J)$$

$$PP=(A+B+C+D)-(E+F+G+H) \text{ and}$$

$$RF=A+B+C+D+E+F+G+H$$

where $A=A1+A2$, $B=B1+B2$, $C=C1+C2$, $D=D1+D2$, $E=E1+E2$, $F=F1+F2$, $G=G1+G2$, $H=H1+H2$, $I=I1+I2+I3+I4$ and $J=J1+J2+J3+J4$.

As obvious from these expressions, the present invention requires only ten signal lines corresponding to A to J for picking up signals for detection while the optical receiving surface of the photodetector 40 has 24 regions from I1 to I4, as shown in FIG. 11.

The regions other than the regions for the 10 signal lines can be wired by semiconductor-microfabrication on the optical receiving surface pattern of the photodetector 40.

Such ten signal lines can be extended from an IC package of a photodetector used for a usual optical pick-up.

As discussed above, according to the present invention, usual push-pull tracking detection can be applied to, for example, DVD-RAMs for the wider land-to-land or groove-to-groove pitch than that for other types of DVD, and also a large diameter of a bundle of beams when a beam of light is divided by hologram.

Moreover, as discussed above, the present invention achieves DPD-detection for DVD-ROMs (video and audio), DPP-detection for DVD-Rs and DVD-RWs, and push-pull detection for DVD-RAMs by means of one optical pick-up.

The optical pick-up according to the present invention is configured such that the holographic device 38 is situated closer to the condenser lens 14 than to the photodetector 40 (L1<L2), as shown in FIG. 8.

This arrangement offers easy fabrication and adjustments for the optical pick-up according to the present invention with less affection of optical axis displacement.

For instance, rewritable DVDs for recording use a wamble signal for referring to addresses on the disk. The wamble signal is used for a disk control with an address signal called a pre-pit for easier detection of an optical pick-up over an optical disk with modulation at a certain frequency to disk grooves or lands even when no signals have been recorded.

These signals are detected by a photodetector using a push-pull signal with only a 10%-tolerance of amount of optical spot displacement to a divisional line for push-pull with respect to a optical spot diameter.

This is discussed further with a well known optical pick-up for astigmatism-focus detection.

An optical spot in the astigmatism-focus detection is converged onto a photodetector with no spot division. The spot division is performed on the divided segments on the photodetector.

A spot diameter on the photodetector is about 50 $\mu$m for a well known pick-up for DVDs. This size is decided, for example, during reproduction from a double-layer DVD, according to conditions for suppressing crosstalk from the layer being not subjected to reproduction to a focusing error signal.

For such a case, the positional displacement of the photodetector (optical spot) have to be adjusted to 10% of the spot diameter, that is, 5 $\mu$m or less.

Almost the same spot size is given by a well known optical pick-up for SSD-detection for the same reason discussed above.

Such a small diameter of a bundle of beams easily suffers thermal expansion when operated and aging, thus resulting in low reliability of an optical pick-up.

On the contrary, the optical pick-up according to the present invention offers about 1.8 mm-beam bundle on the hologram when using the objective lens having a 3.8 mm-effective beam bundle diameter and the signal-detection optical system with a composite lens having a 15 mm-focal length, the hologram being 9 mm apart from the condenser lens but 11.9 mm apart from the photodetector.

Such a large (1.8 mm) diameter of a bundle of beams on the holographic device provides a tolerance of about 0.1 mm-optical spot displacement, thus achieving high reliability.

Figure 12A:
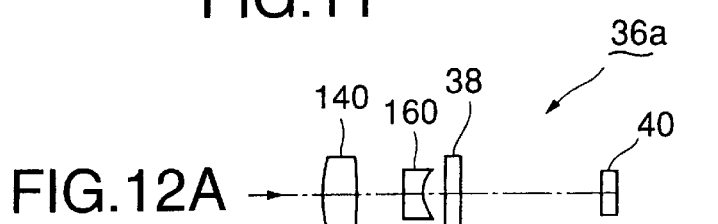
FIGS. 12A and 12B show modifications to a signal-detection optical system installed in the optical pick-up shown in FIG. 8.
Figure 12B:
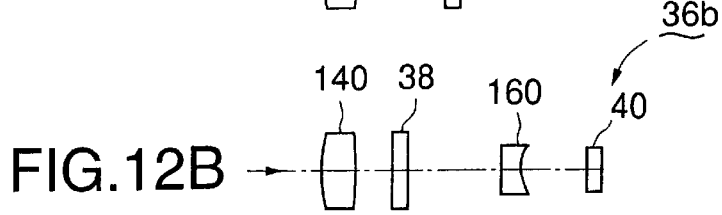

Illustrated in FIGS. 12A and 12B are modifications to the signal-detection optical system 36 (FIG. 8) according to the present invention.

A signal-detection optical system 36a shown in FIG. 12A is equipped with a concave lens 160 between the condenser lens 140 and the holographic device 38.

A convergent bundle of beams formed by the condenser lens 140 are incident to the holographic device 38 via the concave lens 160 for focal length and magnification conversion and further incident to the photodetector 40.

A signal-detection optical system 36b shown in FIG. 12B is equipped with the concave lens 160 between the holographic device 38 and the photodetector 40.

A convergent bundle of beams formed by the condenser lens 140 are incident to the holographic device 38 and further to the photodetector 40 via the concave lens 160 for focal length and magnification conversion.

As disclosed above, the optical pick-up according to the present invention is provided with a bisected-holographic device and a corresponding photodetector, for receiving the ±1th-order diffracted light beams from three beams.

The optical pick-up configured as above is capable of SSD for focus detection with less affection of other signals, DPD and DPP for tracking, and also usual push-pull.

Therefore, one optical pick-up according to the present invention is applicable to several DVD-types.

Moreover, the optical pick-up according to the present invention is provided with the holographic device that is situated on a convergent bundle of beams the diameter of which is large enough among convergent bundles of beams.

The optical pick-up according to the present invention thus offers high reliability against optical axis displacement, installation error, and so on.

What is claimed is:

1. An optical pick-up comprising:
   a condenser lens to accept three laser beams reflected on an optical disk;
   a holographic device to accept the three laser beams via the condenser lens, a surface of the holographic device being divided into a first and a second hologram regions by a bisecting line oriented almost parallel to track formed on the optical disk, thus generating ±1th-order diffracted light beam on the hologram regions; and a photodetector to accept the ±1th-order diffracted light beams to detect signals recorded on the optical disk, the photodetector having a plurality of photo-detecting segments corresponding to the ±1th-order diffracted light beams;

the holographic device generating at least twelve ±1th-order diffracted light beams on the first and the second hologram regions in response to the three laser beams the photodetector including twelve photo-detecting segments, each set of three photo-detecting segments aligned almost parallel to the track formed on the optical disk accepting the +1th-order or the −1th-order diffracted light beams generated o the first or the second hologram region.

2. The optical pick-up according to claim 1, wherein a distance between the condenser lens and the holographic device is shorter than a distance between the holographic device and the photodetector.

3. The optical pick-up according to claim 1 further comprising a concave lens provided between the condenser lens and the holographic device or between the holographic device and the photodetector.

4. The optical pick-up according to claim 1, wherein one photo-detecting segment, provided between the other two of the three photo-detecting segments in each set aligned almost parallel to the track, has a plurality of cells.

5. The optical pick-up according to claim 4, wherein the photo-detecting segment provided between the other two of the three photo-detecting segments has four cells.

6. The optical pick-up according to claim 4, wherein a distance between the condenser lens and the holographic device is shorter than a distance between the holographic device and the photodetector.

7. The optical pick-up according to claim 4, further comprising a concave lens provided between the condenser lens and the holographic device or between the holographic device and the photodetector.

8. The optical pick-up according to claim 5, wherein a distance between the condenser lens and the holographic device is shorter than a distance between the holographic device and the photodetector.

9. The optical pick-up according to claim 5, further comprising a concave lens provided between the condenser lens and the holographic device or between the holographic device and the photodetector.

* * * * *